United States Patent
Lin et al.

(10) Patent No.: US 11,301,608 B2
(45) Date of Patent: Apr. 12, 2022

(54) LAYOUT-BASED SIDE-CHANNEL EMISSION ANALYSIS

(71) Applicant: ANSYS, INC., Canonsburg, PA (US)

(72) Inventors: Lang Lin, Cupertino, CA (US); Dinesh Kumar Selvakumaran, Pflugerville, TX (US); Norman Chang, Fremont, CA (US); Calvin Chow, Redwood City, CA (US); Deqi Zhu, San Jose, CA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 16/948,158

(22) Filed: Sep. 4, 2020

(65) Prior Publication Data

US 2021/0224452 A1 Jul. 22, 2021

Related U.S. Application Data

(60) Provisional application No. 62/704,945, filed on Jun. 3, 2020, provisional application No. 62/962,819, filed on Jan. 17, 2020.

(51) Int. Cl.
| | |
|---|---|
| *G06F 30/347* | (2020.01) |
| *G06F 119/02* | (2020.01) |
| *G06F 119/06* | (2020.01) |
| *G06F 119/10* | (2020.01) |
| *G06F 21/72* | (2013.01) |
| *G06F 21/75* | (2013.01) |
| *G06F 113/18* | (2020.01) |
| *G06F 115/08* | (2020.01) |

(52) U.S. Cl.
CPC ............ *G06F 30/347* (2020.01); *G06F 21/72* (2013.01); *G06F 21/755* (2017.08); *G06F 2113/18* (2020.01); *G06F 2115/08* (2020.01); *G06F 2119/02* (2020.01); *G06F 2119/06* (2020.01); *G06F 2119/10* (2020.01)

(58) Field of Classification Search
USPC .......................................... 716/115
See application file for complete search history.

(56) References Cited

U.S. PATENT DOCUMENTS

| | | | | |
|---|---|---|---|---|
| 2011/0228926 A1* | 9/2011 | Shumow | ................. | H04L 9/003 380/1 |
| 2016/0140274 A1* | 5/2016 | Wachs | .................... | H04L 9/003 703/2 |

* cited by examiner

*Primary Examiner* — Bryce M Aisaka
(74) *Attorney, Agent, or Firm* — Womble Bond Dickinson (US) LLP

(57) ABSTRACT

Methods, machine readable media and systems for simulating the leakage of sensitive data in an integrated circuit, such as cryptographic data or keys, are described. In one embodiment, a method can include the following operations: performing a first dynamic voltage drop (DVD) simulation on a plurality of locations, distributed across an integrated circuit (IC), based on a physical model that specifies physical layout of components on the IC, the IC storing sensitive data in locations of the layout; performing an IC level side channel correlation analysis between each of the locations and the sensitive data based on the results of the first DVD simulation; and selecting, based upon the IC level side channel correlation analysis, a subset of the locations for further simulations to simulate leakage of the sensitive data. Other methods, media and systems are disclosed.

20 Claims, 7 Drawing Sheets

LAYOUT-BASED SIDE-CHANNEL EMISSION ANALYSIS

This application claims priority to and the benefit of U.S. provisional patent application No. 62/962,819, filed Jan. 17, 2020 and claims priority to and the benefit of U.S. provisional patent application No. 62/704,945, filed Jun. 3, 2020, and both of these US provisional patent applications are hereby incorporated herein by reference.

BACKGROUND

Side channel attacks on a device, such as a smart phone or credit card or computer, can non-invasively extract sensitive information, such as cryptographic keys or passwords, from the device. There has been a proliferation of such attacks that exploit unintentional leakage through the "side channel" information which includes information derived from power supply noise (e.g., on a power grid of an IC), power consumption, electromagnetic emission, and thermal emission. For example by measuring the dynamic voltage drop or current draw of a device while performing a large number of encryption/decryption operations, the sensitive information of the device can be learned and extracted through statistical correlation analysis. Current methods to detect these leakages during a process for designing a device rely upon hardware techniques that test the device after manufacturing the device, and these tests are performed in laboratories of certified testing services. These tests can be used to cause a redesign of an IC, but only after the IC has been fabricated.

SUMMARY OF THE DESCRIPTION

The embodiments described herein can provide techniques for simulating and testing a design for sensitive data leakage before the design is fabricated and can do so with methods that reduce usage of computational resources thereby improving the computer technology used to do these simulations. These embodiments can allow the simulation to be used to cause a specific redesign based upon the simulation so that the redesign is informed by the simulation in ways that reduce the leakage of sensitive data (such as cryptographic keys or other data or passwords, etc.).

A method according to one embodiment can include the following operations: performing a first dynamic voltage drop (DVD) simulation on a plurality of locations, distributed across an integrated circuit (IC), based on a physical model that specifies physical layout of components on the IC, the IC storing or transferring sensitive data in locations of the layout; performing an IC level side channel correlation analysis between the predicted sensitive data values and the simulated DVD signature at each of locations; and selecting, based upon the IC level side channel correlation analysis, a subset of the locations for further simulations to simulate leakage of the sensitive data. In one embodiment, the plurality of locations can provide a representative sample of all of the IC and the first DVD simulation can provide information about data leakage on a power grid in the IC or data leakage in the substrate of the IC. In one embodiment, the method can further include the operation of: generating a dynamic power model of the IC based on the selected subset, the selected subset excluding nodes that leak sensitive data less than a threshold value or less than a node in the selected subset. In one embodiment, all locations in the plurality of locations are ranked to select the selected subset based upon an amount of leakage of the sensitive data. In one embodiment, the N most leaky locations (such as nodes or interconnections between cells or other possible types of locations) can be the selected subset based upon a ranking of the most leaky locations, and the excluded locations (e.g., nodes) are processed differently from the selected subset as explained further below in one embodiment. A reference in this description to "DVD simulation" will generally (where applicable) be understood to mean: (1) either one of a dynamic voltage drop simulation or dynamic wire current draw simulation or (2) both simulations. Either or both may be used in the simulation operations to generate the data used in the one or more side channel correlation analyses described herein. Thus in one embodiment, a dynamic simulation can be a dynamic voltage drop simulation or a dynamic wire current (DWC) draw simulation or both of these simulations done together as part of a dynamic simulation.

In one embodiment, the method can further include the operations of: generating a system level model that includes the dynamic power model of the IC and a package level model and a board level model, the package level model including data representing a power grid of a package that is coupled to the IC, and the board level model including data representing a power grid of a board that is coupled to the package; and performing a system level side channel correlation analysis based on the system level model. In one embodiment, the method can further include the operation of: performing a second DVD simulation using user specified DVD toggle vectors for the selected subset and using random (vectorless) DVD toggle vectors for locations not in the selected subset.

In one embodiment, the method can further include the operation of presenting (e.g., displaying) leakage data derived from the system level side channel correlation analysis. For example, the presenting can include displaying one or more of: (a) a matrix of side channel leakage scores or (b) a security density map that visually displays leakage of the sensitive data.

In one embodiment, the method can further include the operation of calculating one or more of: (a) side channel leakage scores or (b) a number of cycles to extract the sensitive data.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
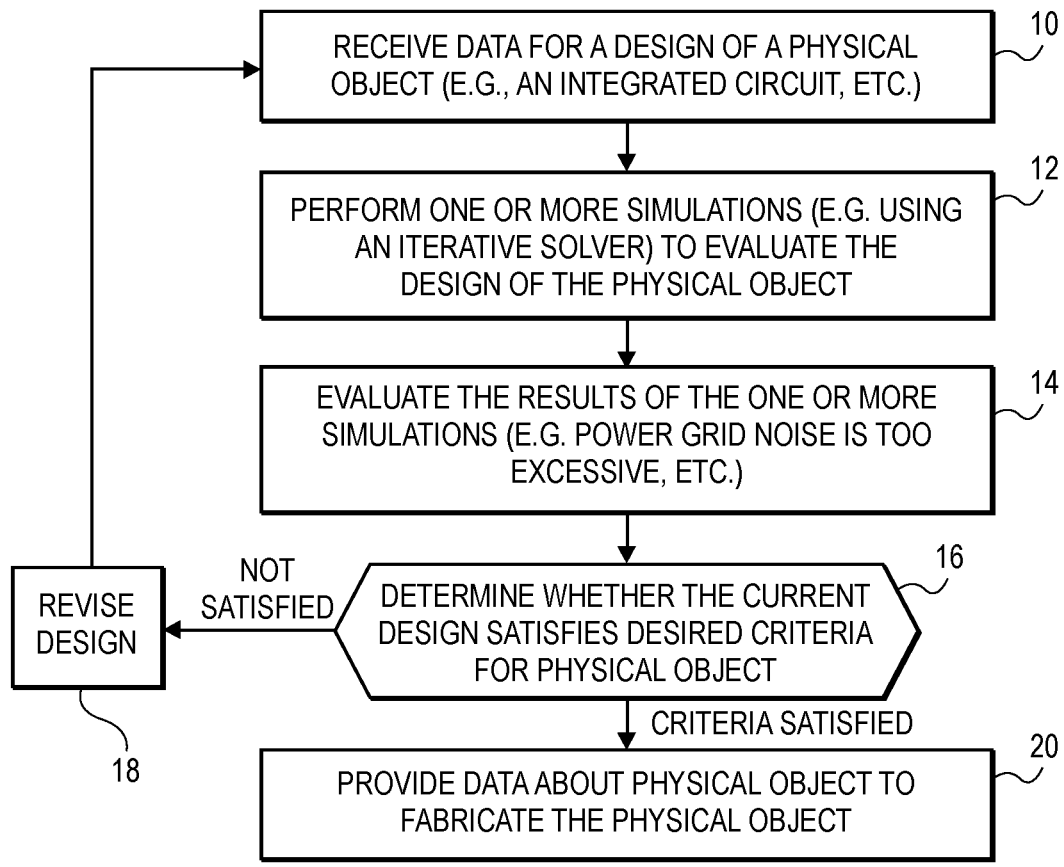
FIG. 1 shows a flow chart that depicts a method that can be used in one embodiment described herein.

The embodiments described herein can be used in simulations of electrical circuits (for example, an IC or a plurality of ICs on a circuit board or set of circuit boards) in order to determine whether a particular design of the circuit satisfies particular requirements for the circuit or system containing the circuit. For example, there might be certain design requirements for protecting sensitive data, such as passwords and other cryptographic data and sensitive data, in a device. FIG. 1 shows a method in which these design requirements can be tested relative to a particular design of an IC or physical system which is being simulated. In operation 10 of FIG. 1, a data processing system can receive data about a design for a particular IC or other electrical circuit. The data can be created in CAD software on a data processing system, and the data can include information about the gates to be used to fabricate the IC, such as cell library information about the gates, etc. Then in operation 12, the data processing system can perform one or more simulations (such as simulations based on dynamic current models) to evaluate the design of the IC. These simulations can use the aspects and embodiments described herein. In one embodiment, the data processing system can perform simulations by using a solver such as an iterative solver which converges upon a solution that specifies parameters relative to the IC in the simulation. For example, the design may be subjected to various different possible cryptographic parameters or keys in an attack to break the cryptographic system and expose the keys used to protect the system or expose other sensitive data. In operation 14, the designer can evaluate the results of one or more simulations to determine whether the design of the IC satisfies certain desired criteria for the design. For example, a designer can determine whether it is too easy to detect the one or more keys (or other sensitive data) in the device from current results. This determination is shown in operation 16. If the one or more criteria is satisfied, then the designer in operation 20 can provide data about the circuit to allow the fabrication or manufacture of the IC or system. For example, if the one or more criteria is satisfied, one or more CAD files can be produced that describe how to build the IC or system. If the criteria are not satisfied as determined in operation 16, the designer can revise the design in operation 18 (for example, by applying known countermeasures on identified leaky instances or by changing sizes and/or quantity of the power distribution network, etc.) and repeat the process by performing additional further simulations to evaluate the redesigned circuit. Thus, the embodiments described herein can be used repeatedly during the redesigning process to evaluate the adequacy of the countermeasures that can be applied during the redesigning process. This can be repeated until the desired criteria are achieved for the circuit.

The embodiments described herein improve upon standard techniques for verifying the level of protection afforded to sensitive data (such as cryptographic keys) by using techniques that improve the speed of simulations and reduce the computational complexity of the simulations, thereby improving the operation of a data processing system (e.g., a computer) performing the simulations and other operations. Moreover, these techniques provide more accurate results more quickly by using actual (known) switching vectors for a portion of the design that contains the security sensitive blocks (such as gates and other logic), and these techniques can limit the analysis to the portion of the design that is most critical to evaluating the level of leakage of sensitive information, such as passwords, hashes, and other information used in cryptographic processing units (such as secure enclave processors, etc.). Furthermore, these techniques can display information about the design using maps and estimates of the number of simulation traces required to expose the one or more cryptographic secrets or sensitive data. It will be understood that the sensitive data can be in various different forms or types, including, for example, passwords, account numbers, account names, hashes, keys of various different types (files keys, device keys), device identifiers, etc.

Figure 2:
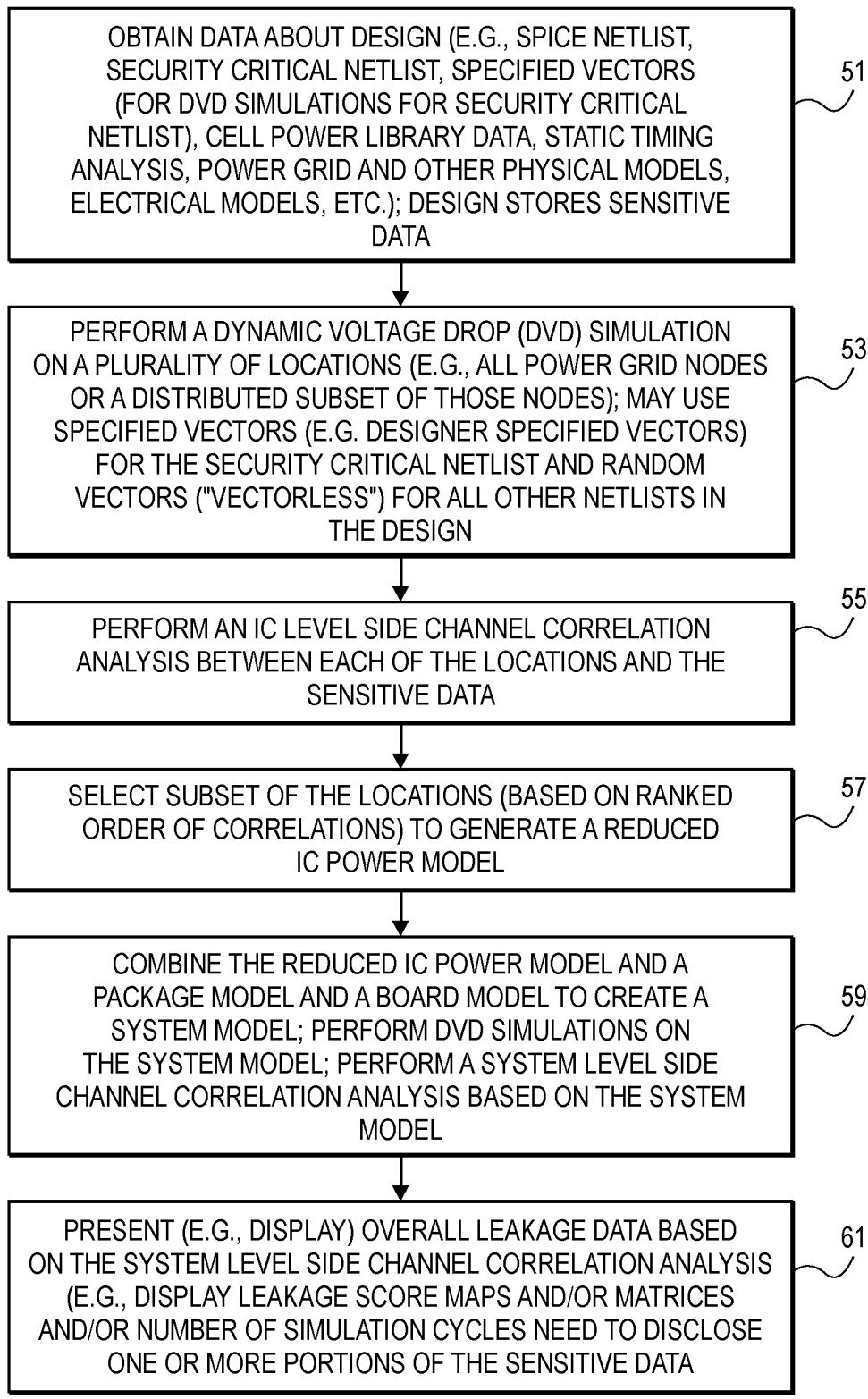
FIG. 2 is a flow chart that shows a method according to one embodiment.

FIG. 2 shows an example of an embodiment that can be used to evaluate the level of protection afforded to sensitive data in a design of a system (such as a smartphone or computer or credit card). The method shown in FIG. 2 can be employed during the design process before fabricating the design, and thus can be employed as part of the method shown in FIG. 1. In operation 51 of FIG. 2, a designer of the system can obtain information about the design, such as one or more SPICE netlists, one or more security netlists, user/designer specified switching vectors for the security netlists, cell power library data, static timing analysis data such as timing windows for switching, power grid design data (such as physical data relating to size and layout of the power grid), other physical design data, and other electrical model data known in the art such as net parasitics and instance timing data, etc. In one embodiment, the data obtained in operation 51 can include a set of pre-characterized multi-state power noise libraries for standard cells, I/O blocks, and IP macro blocks (rather than using transistor level models) to achieve a good trade-off between accuracy and computational efficiency. The designer should have access to information about the sensitive data such as the location of the data in the layout and values of keys or other data (such as unique device identifier data). Further, the designer should also have access to information about the security netlist (such as the security netlist represented in FIG. 3C which is described below). In operation 53, a data processing system can perform a dynamic voltage drop simulation on a plurality of locations in the design; for example, the DVD simulations can be performed on all, or a subset of all, nodes in a power grid that provide power to gates in the design (e.g., on IC metal layer/nodes, instance power/ground nodes, substrate virtual probes). A subset is useful when it is evenly or uniformly distributed over the area of the IC such that the subset of locations provides a sufficient representative sample over all of the IC. In one embodiment, the locations can also include user/designer specified virtual probe points in one or more metal layers of the design. In one embodiment, the DVD simulation in operation 53 can use designer specified vectors (also referred to as "directed vectors") that specify the switching or toggling sequences for the input signals to gates in the security sensitive netlist. In one embodiment, while the gates in the security sensitive portion of the design (e.g., an IC) receive and use the directed vectors during the simulation, the remainder of the design can, in one embodiment, use random switching or toggling sequences (so called vectorless inputs for DVD simulations); the techniques for creating and using such vectorless inputs are known in the art. In one embodiment, the directed vectors can be specified in a file that includes a minimal set of vectors to iterate all possible combination of signal states for the security sensitive portion of the design (e.g., the security netlist). Such signal states can be applied, during the DVD simulation, to the targeted gates of the design and logic coherent states are propagated through the rest of the design.

The result of the DVD simulations in operation 53 can produce waveform data that can be used in an IC level side channel correlation analysis, in operation 55, to determine the amount of leakage of the sensitive data. An example of a side channel correlation analysis is described further below in conjunction with FIG. 4. The analysis in operation 55, in one embodiment, does not take into account the leakage that may occur from the package encasing the IC or the amount of leakage that may occur from the board holding the package; these additional possible sources of leakage are analyzed in subsequent operations shown in FIG. 2. In one embodiment, operation 55 can produce a list of locations based upon the amount of leakage of the sensitive data. This amount can be based upon known side channel correlation analysis (e.g., see flow in FIG. 4) which can reveal the number of simulation traces required to expose (to a certain level of confidence) the sensitive data (such as a particular byte of a cryptographic key); the fewer traces required means the data is less secure and there is more leakage. Thus, the different locations can be ranked based upon level of leakage, and the list of ranked locations can reveal the top N most leaky locations (e.g., N=200 locations). This top N list can then be used in operation 57 to select a subset of locations.

In operation 57, a data processing system can select a subset of the locations used in operation 55 in order to generate a reduced IC power model that can be used in the further processing operations shown in FIG. 2. In one embodiment, the reduced IC power model can include the current profile (describing the physical and electrical model) at only the selected subset of locations and a passive RC network representing the power grid. The subset can be selected by selecting the top N (e.g., N=100 or N=500, etc.) locations that represent the N most leaky locations; larger values for N will require more computational processing in the further processing operations but will likely provide improved accuracy in predicting leakage of the sensitive data. The reduced IC power model is reduced, in one embodiment, by focusing the further processing operations on only the selected subset of locations that are the N most leaky locations of the sensitive data; thus, the analysis in the further processing operations can ignore the other locations in the IC that were not selected. This reduces computations in the further processing operations (thereby improving the operation of the data processing system that performs the computations) while still providing accuracy for evaluating leakage of the sensitive data. These N most leaky locations can also include user/designer specified virtual probe points in one or more metal layers of the design.

In operation 59, a data processing system can combine the reduced IC power model with a package power model and a board power model. The package power model can include a representation of the power distribution nodes in the package of the IC that holds or contains or surrounds the IC; this package power model can include physical and electrical model information about the resistances in the power distribution nodes of the package. The board power model can include a representation of the power distribution nodes of the board on which the package is mounted; the board can be a printed circuit board that includes conductors on one or both surfaces as well as conductors within the board. This board power model can include physical and electrical model information about the resistances in the power distribution nodes of the board. The combination of the reduced IC power model, the package power model and the board power model can be referred to as a system model. In operation 59, the data processing system can perform one or more DVD simulations on the system model to produce a set of waveforms that can be analyzed by a system level side channel correlation analytics engine (which can be similar to the IC level side channel correlation analytics engine). In one embodiment, the DVD simulations can use designer specified vectors for the security netlist (e.g., the logic in the design's cryptographic engine or processor) while using random vectors (also referred to as vectorless) for nodes in the models that are not in the security netlist. These designer specified vectors can represent the actual signal switching or toggling that actually occurs as the logic in the security netlist performs a sequence of cryptographic operations. In one embodiment, the DVD simulations can be run for more cycles over a longer period of clock cycles than the DVD simulations in operation 53, thereby allowing the security netlist to run through an entire sequence of, for example, actual cryptographic computations that are normally performed during use of the IC (e. g., computations used to verify a user password or computations used during a secure boot sequence which verifies the integrity of the system code). Thus, operation 59 can provide a robust test of leakage of the design at a system level using practical, actual examples of cryptographic algorithms (which often use numerous rounds) used by the device during normal operation. The longer sequence (such as millions of cycles) in operation 59 is also more likely to reveal leakage than a shorter sequence used in, for example, operation 53 (which may use only about a few hundred cycles or a few thousand cycles in one embodiment).

The output from the system level side channel correlation analysis (in operation 59) can be used to provide information, in one or more various formats, about the leakage of the system in operation 61. For example, the data processing system can, in one embodiment, display the outputs as security density maps that visually display leakage of sensitive data relative to physical locations on the design (such as the maps shown in FIGS. 5A and 5B which are described below). The data processing system can also display the outputs as a matrix of side channel leakage scores. The data processing system can also display a graph (or other data format) that shows the number of simulation cycles required to expose the sensitive data (which can be referred to as simulation measurement to disclosure—SMTD, where the SMTD value is derived from a simulation in software as opposed to a hardware test of a hardware system).

Figure 3A:
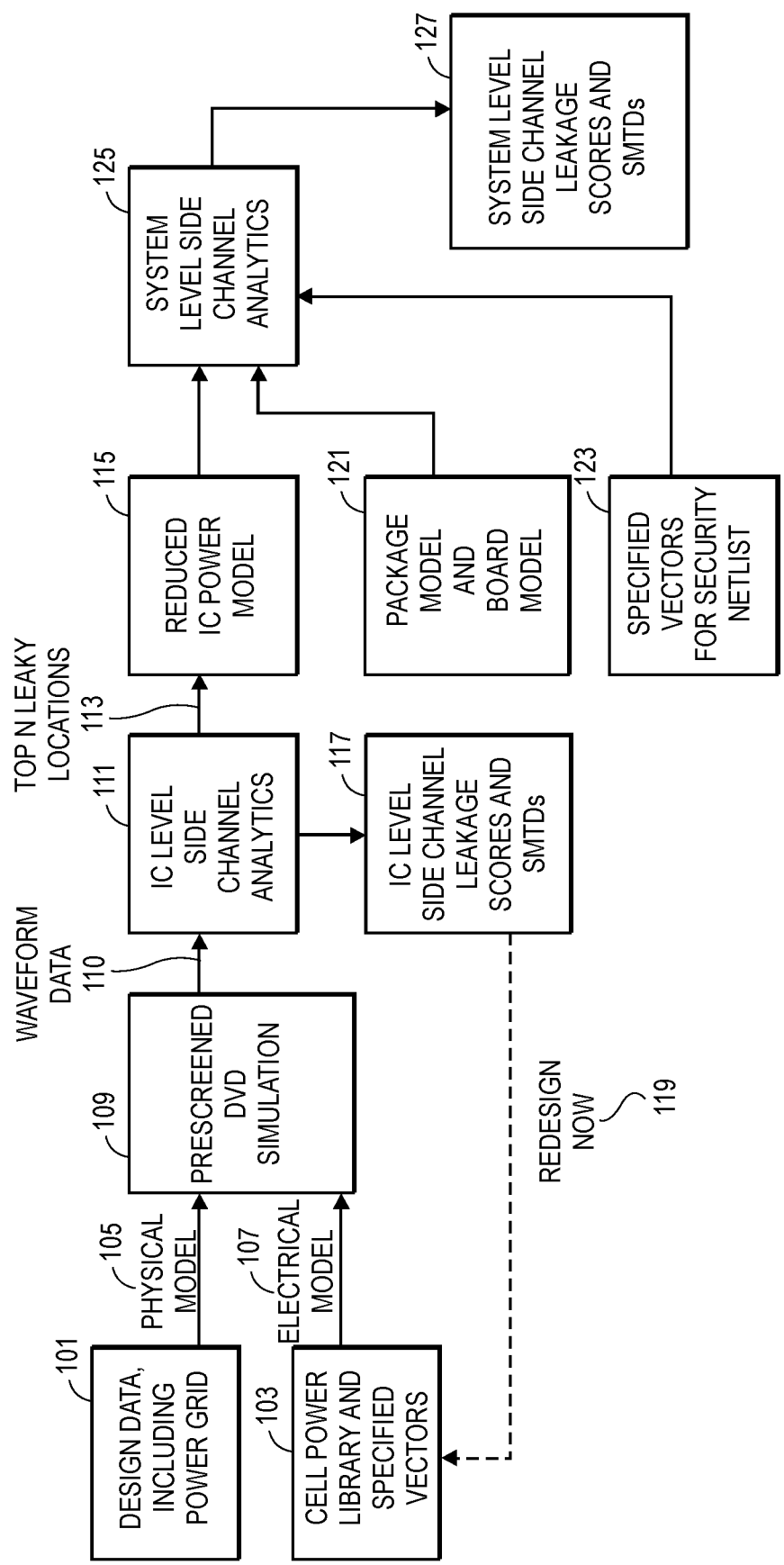
FIG. 3A is a flow chart that shows a method according to one embodiment.

FIG. 3A shows a representation of an embodiment which is similar to the embodiment shown in FIG. 2. The embodiment shown in FIG. 3A can be viewed as a method performed on a data processing system, such as a computer which is executing CAD or CAE software to design an integrated circuit which is part of a system that includes a package (that contains the IC) and a board which holds the package. A designer of the system will normally have access to considerable information, known in the art, about the particular design, including design information at the physical model level which includes information such as design data 101 about the power grid; further, the designer will have information which can be considered part of the electrical model 107, such as cell power library data and designer specified switching vectors for the security netlist. In the example shown in FIG. 3A, the cell power library and the specified vectors 103 can be used to provide an electrical model 107 which is combined with the physical model 105 as inputs to a prescreened DVD simulation 109. The prescreened DVD simulation 109 can be similar to the DVD simulation in operation 53 of FIG. 2. This prescreened DVD simulation 109 can use, in one embodiment, designer specified vectors of the security netlist while using random vectors (referred to as vectorless) for locations outside of the security netlist. The designer specified vectors can represent the changing signal states, for signals in the security netlist, over time as the security portion of the design performs a sequence of known, predetermined cryptographic operations using known inputs, such as the correct cryptographic key.

Figure 4:
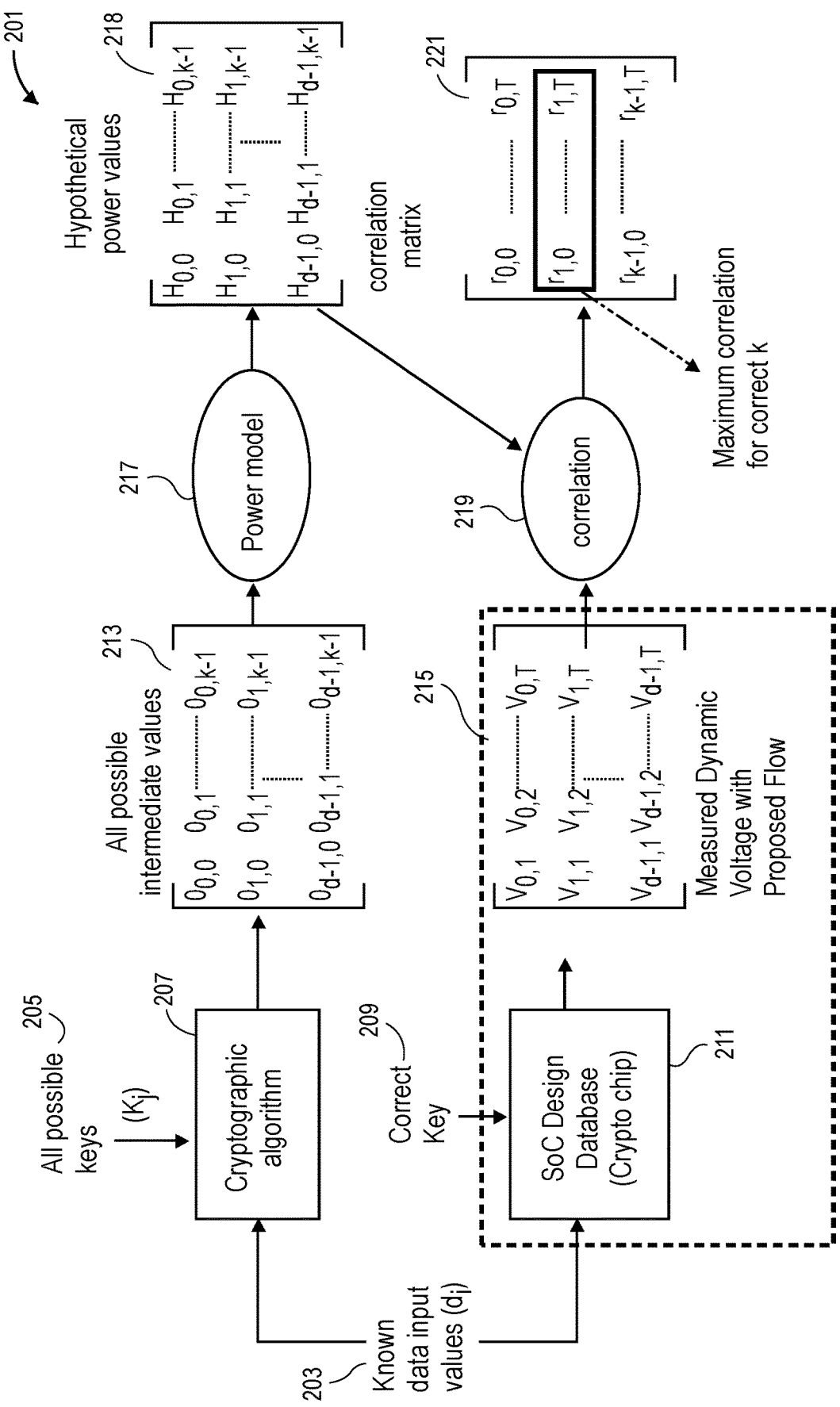
FIG. 4 shows an example of a side channel correlation power analysis that can be used with one or more embodiments.

The output from this DVD simulation can include raw waveform data 110 representing the dynamic demand current across a plurality of locations in the design of the IC over the sequence of cycles. In addition, in one embodiment, electromagnetic side channel leakage analysis can be included at this point by integrating regional wire current to generate a near field electromagnetic waveform at a user specified distance. This regional wire current can be obtained from dynamic wire current draw simulations in one embodiment. In one embodiment, the locations can include all nodes on the power grid as well as virtual probe points added by the designer. In one embodiment, this waveform data 110 can then be analyzed using the IC level side channel correlation analytics engine 111; an example of a flow of processing an IC level side channel correlation analytics engine is shown in FIG. 4. At this point in the process, the IC level side channel correlation analytics engine 111 can provide one or more outputs 117 about IC level side channel leakage scores and even SMTD values which can be evaluated by the designer at this point in time of the design process. If, for example, these outputs 117 indicate that one or more portions of the design are very leaky, the designer may undertake a redesign now (shown as operation 119 and FIG. 3A) rather than going any further in the method shown in FIG. 3A with the current design. The redesign at this point in operation 119 may use conventional countermeasures such as the addition of decoupling capacitors or other techniques that can be used to reduce leakage in the design. Further, the designer can use the information from the outputs 117 (such as a leakage score map) to identify the specific portions (and locations of those portions) in the IC that require countermeasures to reduce leakage.

An output from the IC level side channel correlation analytics engine 111 can include a ranked list of the most leaky locations such as the top N leaky locations 113. This top N leaky locations 113 is used as an input to generate a reduced IC power model 115. This reduced IC power model can be similar to the reduced IC power model described in conjunction with the method shown in FIG. 2. This reduced IC power model 115 can then be combined with a package model and a board model 121 to create a system model which can be evaluated by the system level side channel correlation analytics engine 125. In one embodiment, the system level side channel correlation analytics engine can process a further DVD simulation using designer specified vectors for the security netlist 123. In other words, a DVD simulation on the system level model can use the designer specified vectors for the security netlist 123 to perform an extended sequence of DVD simulation cycles based upon the known and predetermined cryptographic operations using the known sensitive data, such as the actual key. This DVD simulation can be similar to the DVD simulation in operation 59 of FIG. 2 and can involve millions of simulation cycles over an extended sequence of cryptographic operations as describe above. The directed vectors for the security netlist (also referred to as designer specified vectors) will trigger the exact side channel leakage signatures to excite the entire IC-package-board power grid network in this DVD simulation, and thus the entire power distribution network can be scored to understand how the side channel leakage signal propagates through the system. This direct vector control technique enables precise leakage simulation with millions of cycles until enough statistical confidence level is met to disclose the sensitive data. The output of this DVD simulation can then be analyzed by a system level side channel correlation analytics engine 125 to provide system-level side channel leakage scores and SMTDs 127. These system-level side channel leakage scores and SMTDs can then be evaluated to determine whether or not the design is adequate based upon these leakage scores and SMTDs. In one embodiment, the SMTD metrics can be applied at both peak and leading/trailing edges of a dynamic voltage drop waveform on the identified probe nodes, and even with additional power noise or timing jitter included. Various different sampling voltages within a cycle can be simulated and represented by the SMTD metric, so the embodiments can be adapted to various formulations of time/location dependent side channel attack types.

FIG. 4 shows an example of a flow in a side channel correlation power analytics engine 201. The engine can be used for both IC level and system level side channel correlation analyses, and the flow for both can be the same. This flow can receive known data input values 203 which are known to be used in a particular cryptographic algorithm that is used in the design; for example, these known data input values can include constant values and other values used in the cryptographic algorithm. These known input data values are applied to the cryptographic algorithm 207 using all possible keys 205 to create a set of all possible intermediate values 213. These known input data values were also applied to the security netlist represented by the design database 211 during the DVD simulation (e.g., in operation 109 of FIG. 3A or operation 53 in FIG. 2), and this security netlist also received the correct key 209 in that DVD simulation. The result of the DVD simulation is a set of measured (from the simulation) dynamic voltages 215 over a set of cycles, given the sequence of cryptographic operations, and this set of measured dynamic voltages 215 is compared in a correlation operation 219 to the hypothetical power values 218 that were derived from the power model 217. The power model 217 can, in one embodiment, be a Hamming Distance or Hamming weight of the outputs in the set of all possible intermediate values 213. The result of the correlation operation 219 can be a matrix 221 of correlation values, which can reveal the maximum correlation for the guessed key. The absolute maximum value along a row of the matrix 221 is the guessed key. Assuming there are 1000 virtual probes (e.g., on IC metal layer/nodes, instance power/ground nodes or pins, substrate power noise in the form of dynamic voltage and current), the flow in FIG. 4 will produce 1000 correlation coefficients with location annotations (to associate the location in the layout of the system with the particular correlation coefficient).

A metric referred to as a side channel leakage score (SLS) can be defined as the ratio of (a) the correlation coefficient of the correct key to (b) the maximum correlation coefficient of the guessed key among all possible key values. In particular, SLS=(correlation coefficient of correct key)/(maximum correlation coefficient of guessed key). If the SLS value is 1 or nearly 1, then the correct key for the given probe is revealed with fewer number of traces, which means the design is highly leaky. If the SLS is close to zero (0), then the probes are not leaky for the given number of traces. Side channel vulnerability can be defined as the correlation between the cryptographic algorithm's execution pattern and the attacker's side channel observation.

Figure 3B:
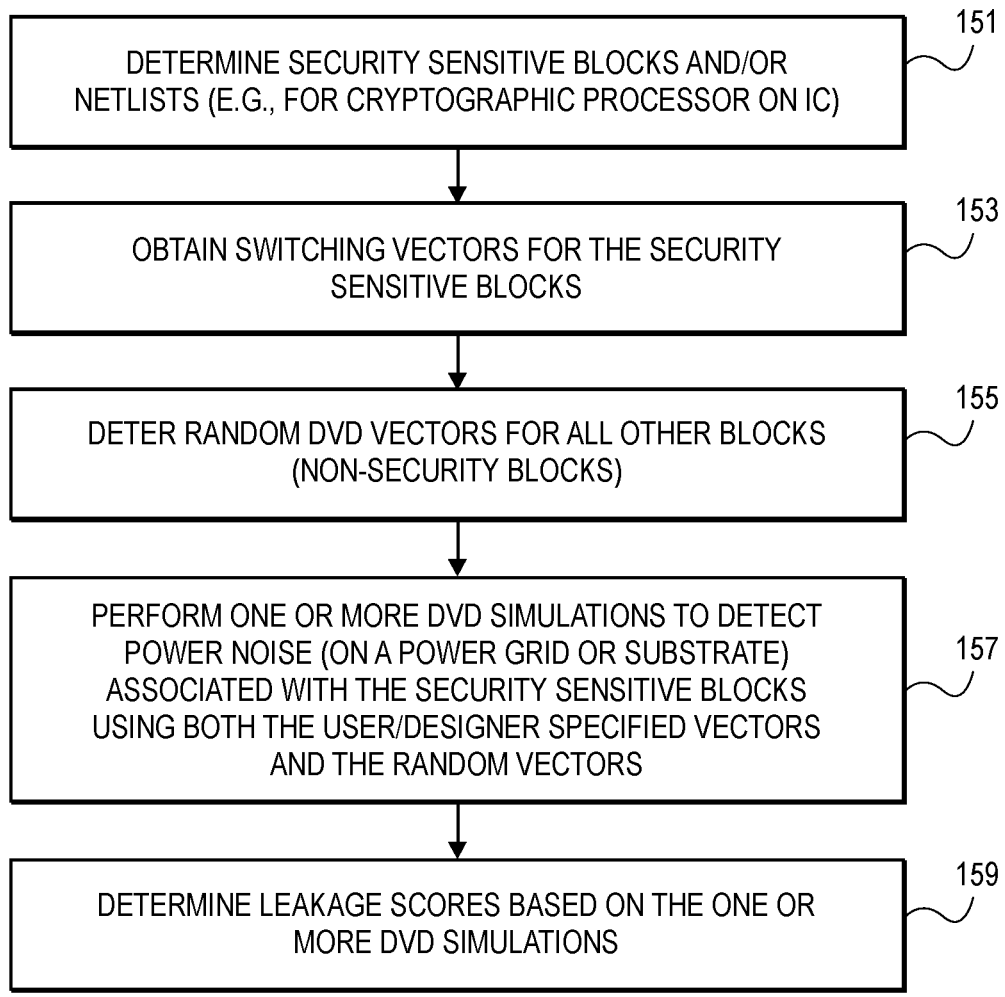
FIG. 3B is another flow chart that illustrates a method according to one embodiment.
Figure 3C:
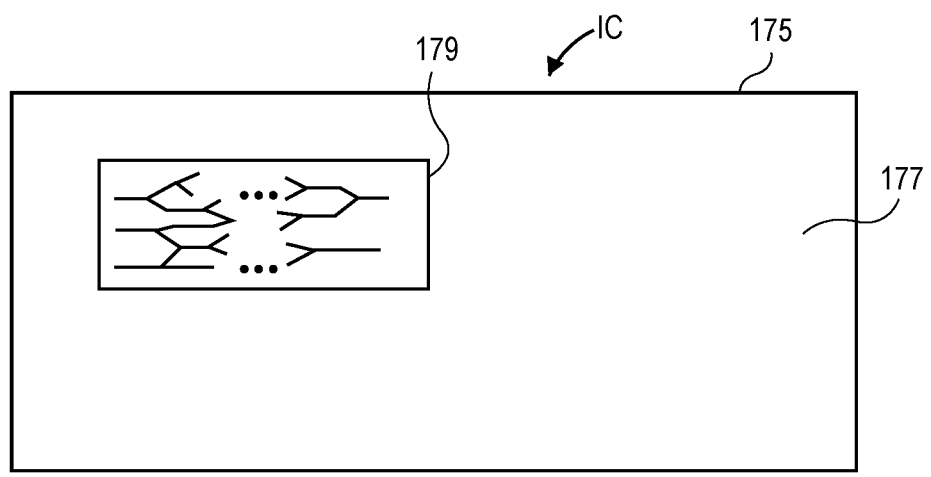
FIG. 3C shows an example of how a circuit design can be partitioned and simulated with both specified vectors and vectorless (random) switching inputs for one or more DVD simulations.

The embodiments described herein can use a directed vector approach that is emphasized in the method shown in FIG. 3B. It will be appreciated that the method shown in FIG. 3B can be part of the methods described previously; the method shown in FIG. 3B is presented in order to emphasize the hybrid approach of using a directed vector set for the security sensitive blocks while using random (vectorless) vectors for the rest of the design. In operation 151, the designer determines the location and netlists for one or more security sensitive blocks. For example, a system-on-a-chip (SOC) design will often include a separate cryptographic processor on the integrated circuit; for example, a system-on-a-chip design may include a processor within what is referred to as a secure enclave processor on the chip (IC). This separate cryptographic processor can be surrounded by other processors and logic that is not security sensitive. The designer will specify the security sensitive blocks and their netlist's and the placement on the current design in operation 151. Then in operation 153, the designer can obtain the switching vectors (directed vectors) for only the security sensitive blocks. In one embodiment, these vectors need not include all vectors for all cryptographic operations in a sequence of such operations; for example, the last cryptographic operation after a series of AES rounds may be sufficient for purposes of evaluating leakage. In operation 155, the designer can then determine random DVD switching vectors for all other blocks using techniques known in the art to create and use such random DVD vectors. Then in operation 157, a data processing system can perform one or more simulations to detect power noise, such as power noise on a power grid associated with the security sensitive blocks using both the designer specified vectors and the random vectors. Then in operation 159, the data processing system can determine leakage scores based upon the one or more DVD simulations. FIG. 3C shows an example of how the designer can determine the security sensitive blocks and their corresponding netlists. In the example of the integrated circuit 175, most of the circuit is not security sensitive, and this is shown as the region 177. The block 179 includes the security sensitive netlist. In this example, there is a single security sensitive block on the entire integrated circuit. In other designs, there may be multiple security sensitive blocks distributed over the entire area of the integrated circuit.

Figure 5A:
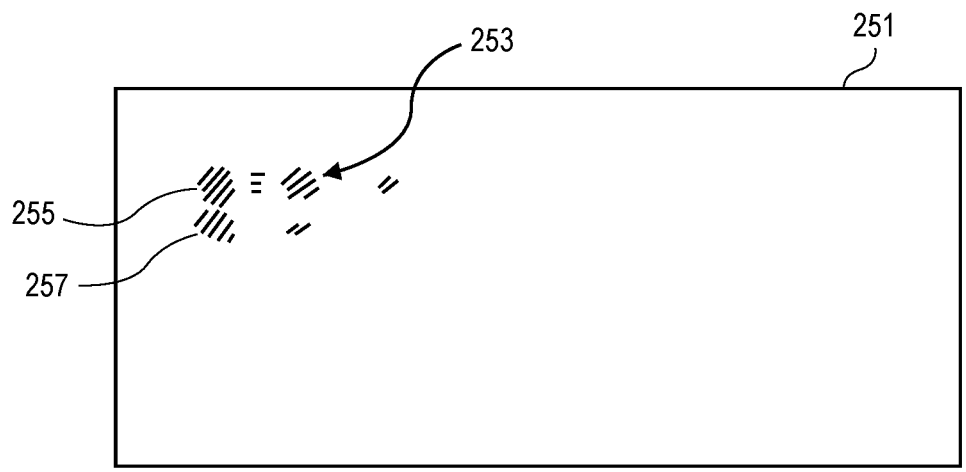
FIGS. 5A and 5B show examples of side channel leakage score maps that can be produced with one or more embodiments described herein.
Figure 5B:
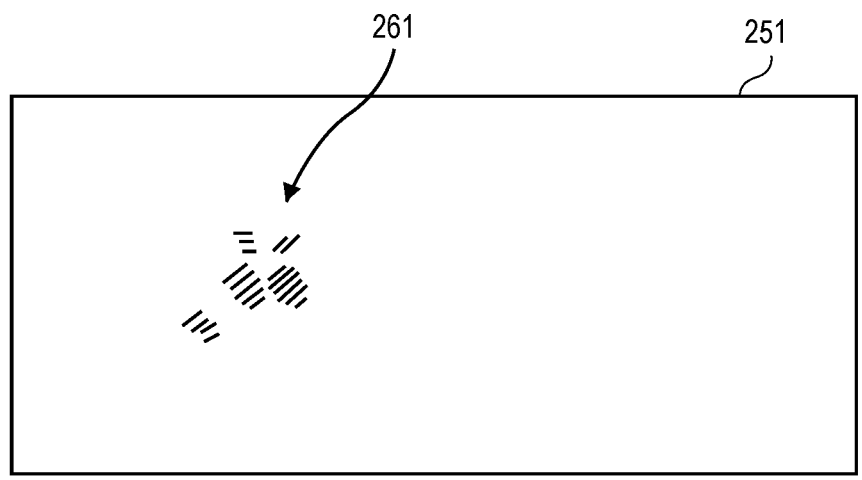

FIGS. 5A and 5B show examples of maps which reflect leakage scores. In one embodiment, these maps can be displayed in color (not shown) to reflect leakage as a function of color. In the examples shown in FIGS. 5A and 5B, the leakage scores (e.g., SLS) are shown with different variations of crosshatching. FIG. 5A may show spatially distributed SLS scores for a particular portion of the key (e.g., first byte of the key) over the area of the integrated circuit 251 while FIG. 5B may show the spatially distributed SLS scores for another portion of the key over the area of the integrated circuit 251. In the example shown in FIG. 5A, high leakage scores, such as scores 255, 257 and 253 are near moderate leakage scores in a region of the integrated circuit 251. The leakage scores 261 shown in FIG. 5B are slightly offset spatially relative to the high leakage scores shown in FIG. 5A. The designer can use the spatial distribution of these high leakage scores to implement countermeasures in the appropriate regions specified by the maps.

Figure 6:
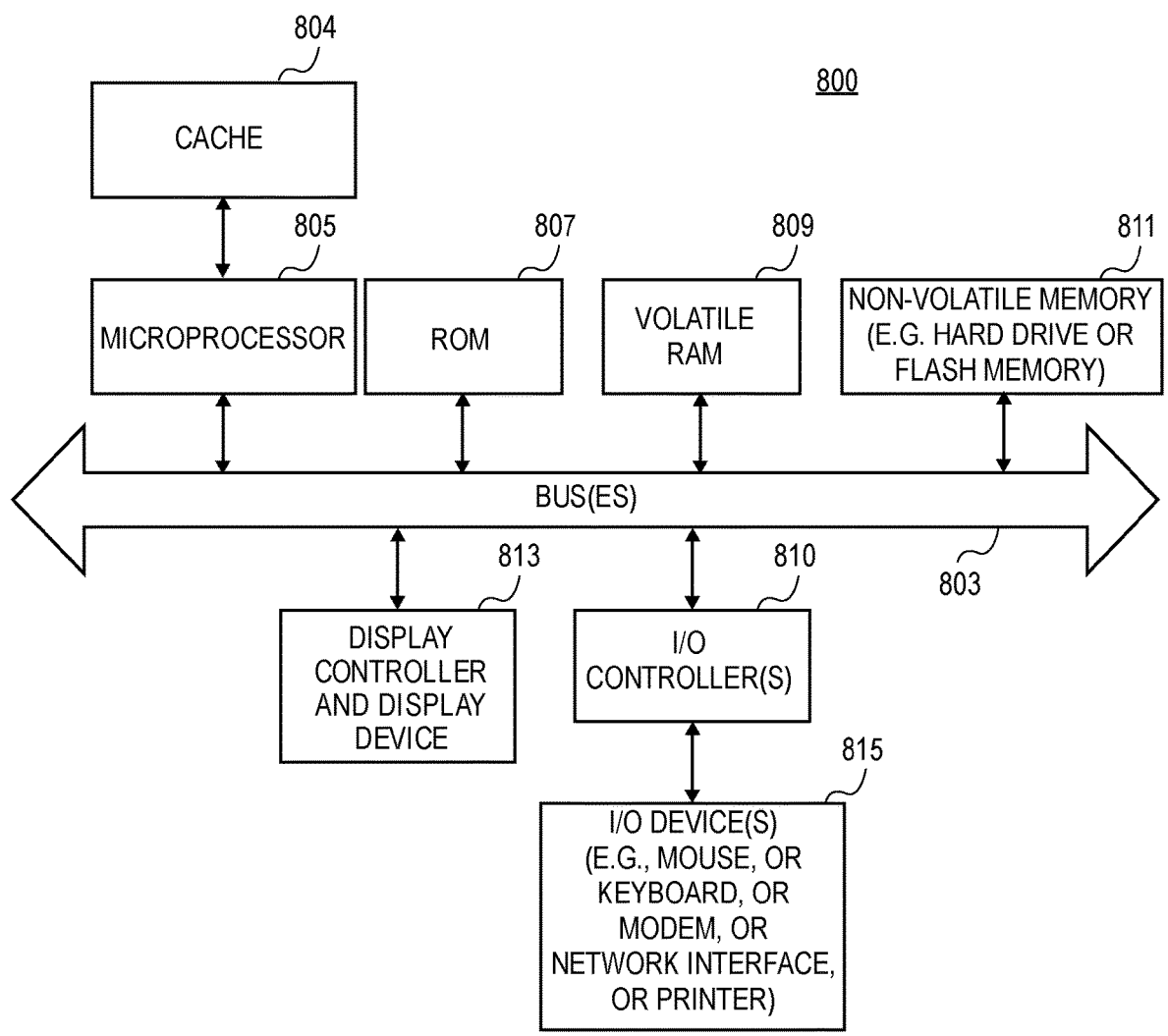
FIG. 6 shows an example of a data processing system that can be used to implement one or more embodiments described herein.

FIG. 6 shows one example of a data processing system 800, which may be used with one embodiment. For example, the system 800 may be implemented to provide a computer system or device that performs any one of the methods shown (e.g., FIG. 1, 2,3A, or 3B) or described herein. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method for simulating leakage of sensitive data from a device, the method comprising:
    performing a first dynamic simulation on a plurality of locations, distributed across an integrated circuit (IC), based on a physical model that specifies physical layout of components on the IC, the IC storing or transferring sensitive data in locations of the layout;

performing an IC level side channel correlation analysis between predicted sensitive data values and a simulated signature at each of the locations based on the results of the first dynamic simulation;

selecting, based upon the IC level side channel correlation analysis, a subset of the locations for further simulations to simulate leakage of the sensitive data;

wherein the first dynamic simulation provides information about noise or data leakage on a power grid in the IC and wherein the first dynamic simulation is one or both of: a dynamic voltage drop simulation or a dynamic wire current draw simulation.

2. The medium as in claim 1, wherein the plurality of locations provide a representative sample of all of the IC.

3. The medium as in claim 1, wherein the method further comprises:

generating a dynamic power model of the IC based on the selected subset, the selected subset excluding nodes that leak sensitive data less than a threshold value or less than a node in the selected subset.

4. The medium as in claim 3, wherein all locations in the plurality of locations are ranked to select the selected subset based upon an amount of leakage of the sensitive data.

5. The medium as in claim 4, wherein the method further comprises:

generating a system level model that includes the dynamic power model of the IC and a package level model and a board level model, the package level model including data representing a power grid of a package that is coupled to the IC, and the board level model including data representing a power grid of a board that is coupled to the package;

performing a system level side channel correlation analysis based on the system level model.

6. The medium as in claim 5, wherein the method further comprises:

performing a second dynamic simulation using user specified dynamic voltage drop (DVD) toggle vectors for the selected subset and using random (vectorless) DVD toggle vectors for locations not in the selected subset.

7. The medium as in claim 6, wherein the method further comprises:

presenting leakage data derived from the system level side channel correlation analysis.

8. The medium as in claim 7, wherein the method further comprises:

calculating one or more of: (a) side channel leakage scores or (b) a number of cycles to extract the sensitive data.

9. The medium as in claim 8, wherein the presenting comprises: displaying one or more of: (a) a matrix of side channel leakage scores or (b) a security density map that visually displays leakage of the sensitive data.

10. The medium as in claim 4, wherein the method further comprises:

performing a second dynamic simulation using user specified dynamic voltage drop (DVD) toggle vectors for the selected subset and using random (vectorless) DVD toggle vectors for locations not in the selected subset and wherein the second dynamic simulation is one or both of: a dynamic voltage drop simulation or a dynamic wire current draw simulation.

11. A machine implemented method for simulating leakage of sensitive data from a device, the method comprising:

performing a first dynamic simulation on a plurality of locations, distributed across an integrated circuit (IC), based on a physical model that specifies physical layout of components on the IC, the IC storing or transferring sensitive data in locations of the layout;

performing an IC level side channel correlation analysis between predicted sensitive data values and a simulated signature at each of the locations based on the results of the first dynamic simulation;

selecting, based upon the IC level side channel correlation analysis, a subset of the locations for further simulations to simulate leakage of the sensitive data;

wherein the first dynamic simulation provides information about noise or data leakage on a power grid in the IC and wherein the first dynamic simulation is one or both of: a dynamic voltage drop simulation or a dynamic wire current draw simulation.

12. The method as in claim 11, wherein the plurality of locations provide a representative sample of all of the IC.

13. The method as in claim 11, wherein the method further comprises:

generating a dynamic power model of the IC based on the selected subset, the selected subset excluding nodes that leak sensitive data less than a threshold value or less than a node in the selected subset.

14. The method as in claim 13, wherein all locations in the plurality of locations are ranked to select the selected subset based upon an amount of leakage of the sensitive data.

15. The method as in claim 14, wherein the method further comprises:

generating a system level model that includes the dynamic power model of the IC and a package level model and a board level model, the package level model including data representing a power grid of a package that is coupled to the IC, and the board level model including data representing a power grid of a board that is coupled to the package;

performing a system level side channel correlation analysis based on the system level model.

16. The method as in claim 15, wherein the method further comprises:

performing a second dynamic simulation using user specified dynamic voltage drop (DVD) toggle vectors for the selected subset and using random (vectorless) DVD toggle vectors for locations not in the selected subset.

17. The method as in claim 16, wherein the method further comprises:

presenting leakage data derived from the system level side channel correlation analysis.

18. The method as in claim 17, wherein the method further comprises:

calculating one or more of: (a) side channel leakage scores or (b) a number of cycles to extract the sensitive data.

19. The method as in claim 18, wherein the presenting comprises: displaying one or more of: (a) a matrix of side channel leakage scores or (b) a security density map that visually displays leakage of the sensitive data.

20. The method as in claim 14, wherein the method further comprises:

performing a second dynamic simulation using user specified dynamic voltage drop (DVD) toggle vectors for the selected subset and using random (vectorless) DVD toggle vectors for locations not in the selected subset and wherein the second dynamic simulation is one or both of: a dynamic voltage drop simulation or a dynamic wire current draw simulation.

\* \* \* \* \*